United States Patent [19]
Peters

[11] 3,853,241
[45] Dec. 10, 1974

[54] CHEESE MAKING APPARATUS
[75] Inventor: Norman J. Peters, Fon du Lac, Wis.
[73] Assignee: DEC International, Inc., Madison, Wis.
[22] Filed: July 17, 1972
[21] Appl. No.: 272,349

Related U.S. Application Data
[60] Division of Ser. No. 871,441, Feb. 10, 1970, Pat. No. 3,696,950, which is a continuation-in-part of Ser. No. 669,572, Sept. 21, 1967, abandoned.

[52] U.S. Cl.................. 220/344, 49/482, 49/485, 220/32
[51] Int. Cl........................ B65d 53/00, E06b 7/16
[58] Field of Search......... 220/46 R, 46 MS, 32, 36; 49/475, 482, 484, 485; 99/452; 126/190; 296/56; 312/296, 327, 328, 138

[56] References Cited
UNITED STATES PATENTS

| | | | |
|---|---|---|---|
| 1,170,797 | 2/1916 | Burroughs | 220/36 |
| 1,778,943 | 10/1930 | Hoffmann | 126/190 |
| 2,529,478 | 11/1950 | Bach | 220/36 |
| 3,029,805 | 4/1962 | Scott | 126/190 |
| 3,157,306 | 11/1964 | Courson | 312/214 |
| 3,404,675 | 10/1968 | Payne | 126/190 |
| 3,439,668 | 4/1969 | Tilus | 126/190 |
| 3,504,456 | 4/1970 | Frederick, Jr. | 49/482 |

Primary Examiner—William I. Price
Assistant Examiner—Allan N. Shoap
Attorney, Agent, or Firm—Andrus, Sceales, Starke & Sawall

[57] ABSTRACT

This invention relates to cheese making equipment including a vat to contain cheese curd, and a portable unloading unit for conveying the curd from the vat to an elevated location. The vat is provided with an open end which is enclosed by a hinged door and the cheese curd is removed from the vat by a blade attached to a reciprocating carriage. The blade acts to push the curd out of the open end of the vat into a hopper of a portable unloader unit where a horizontal auger, located within the hopper, conveys the curd to an inclined auger which extends upwardly and discharges the curd into hoops or onto a conveying system.

4 Claims, 10 Drawing Figures

PATENTED DEC 10 1974 3,853,241

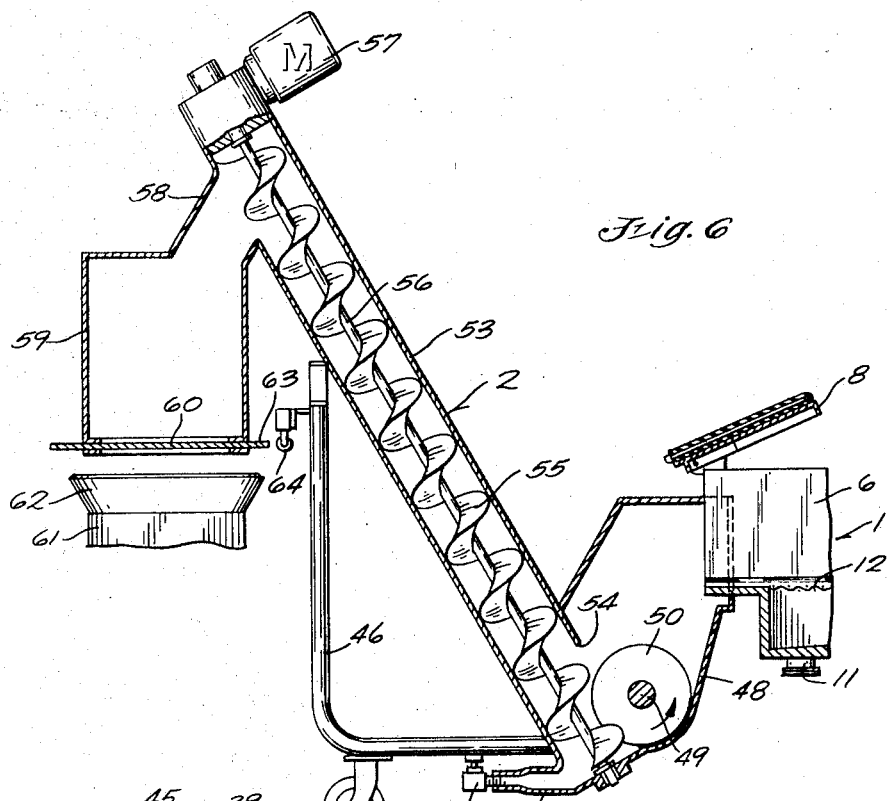
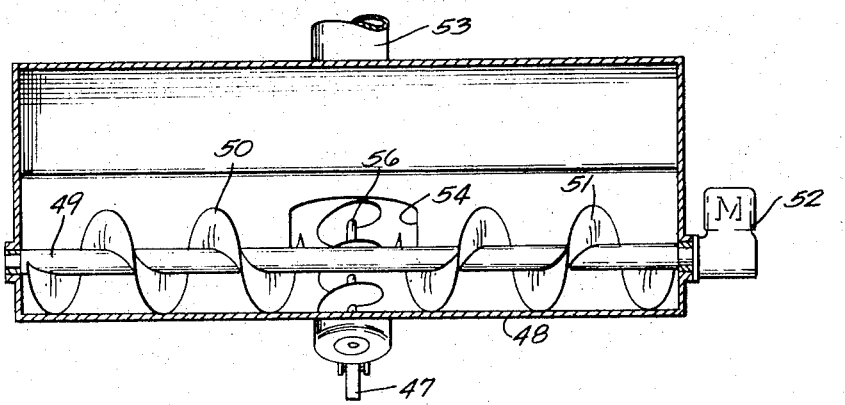

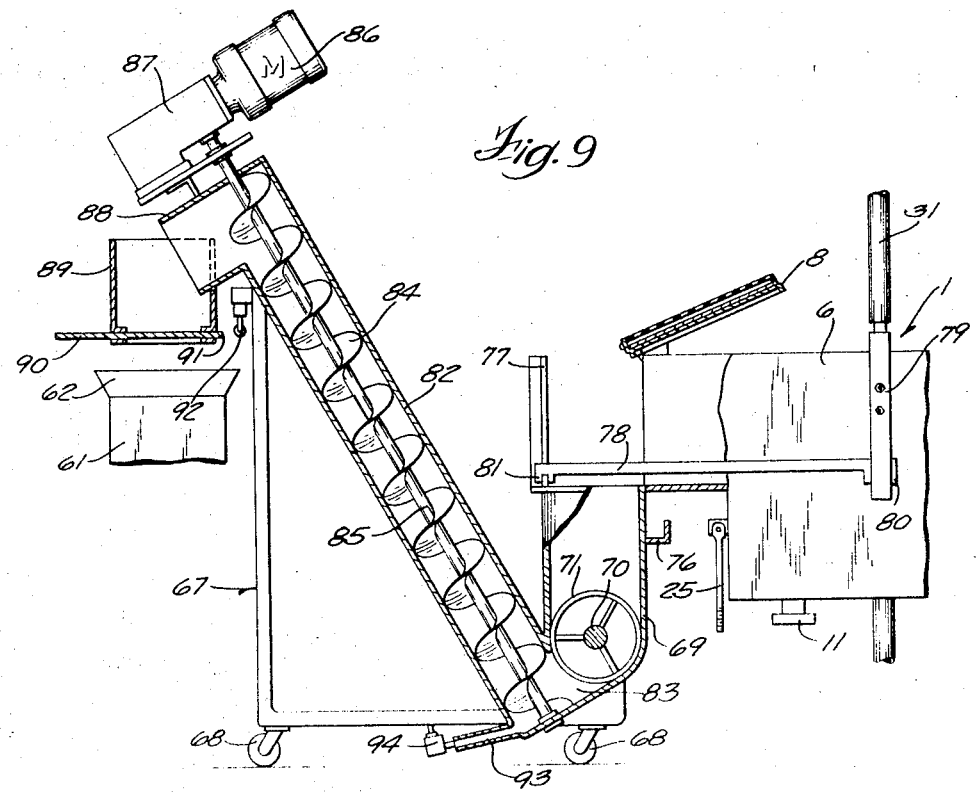
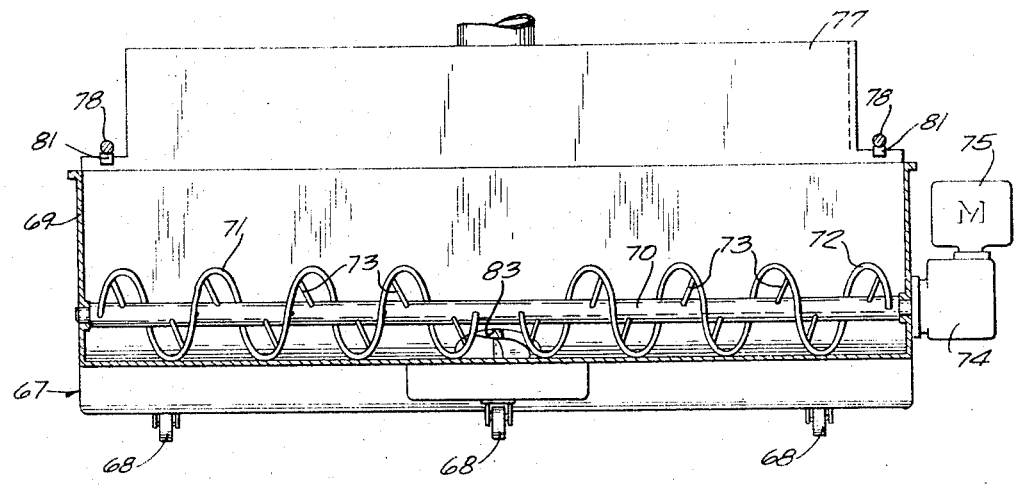

CHEESE MAKING APPARATUS

This application is a division of application Ser. No. 871,441, filed Feb. 10, 1970, now U.S. Pat. No. 3,696,950, which in turn is a continuation-in-part of application Ser. No. 669,572, filed Sept. 21, 1967, and entitled Cheese Making Apparatus now abandoned.

In the conventional cheese making process for producing cheddar, colby or stirred curd cheese, the curd and whey are transferred from the cheesemaking vat to a finishing vat where the curd is slowly agitated and the whey is drawn off. Subsequently, the cheddar type curd is milled and, in all cases, the moist curd is agitated by forking paddles which travel the length of the vat on a reciprocating carriage. In the conventional process the curd is removed from the vat by manual shoveling and placed in hoops. Recently, finishing vats have been constructed with an open end enclosed by a removable or hinged door. With a vat of this type, the curd, instead of being shoveled out of the vat, is pushed out of the open door into a series of hoops or onto a conveyor system.

The present invention is directed to an improved cheesemaking apparatus which includes an open end vat employed in combination with a portable unloading unit. More specifically, the vat includes a carriage which is mounted for reciprocating travel above the vat and a series of arms are mounted on the carriage and carry a blade adapted to engage the curd and push the curd out of the open end of the vat as the carriage moves in its reciprocating path of travel. The blade is pivotally connected to the arms so that as the carriage moves in a direction toward the open end, the blade will be firmly positioned with respect to the arm so that the blade can plow or scrape the curd through the open end. As the carriage moves in the opposite direction, the blade pivots upwardly over the mess of curd to position the blade behind a second length of curd mass for the next reciprocating stroke.

The curd is discharged from the vat into the hopper of a portable unloading unit. Located within the hopper is a horizontal auger which moves the curd toward the inlet of an inclined auger conveyor, and the inclined conveyor conveys the curd upwardly and discharges the curd either into hoops or onto a conveyor system.

The open end vat has positive advantages over the conventional vat in which the curd is unloaded manually by shoveling. Not only does the open end vat eliminate the manual labor involved in shoveling the curd, but there is less spillage of the curd and a more sanitary operation results due to the fact that there is less human contact with the curd.

The invention also provides a unique mounting arrangement of the blades on the reciprocating carriage which enables the forking paddles to be used simultaneously with the blades to thereby continuously agitate the curd during the unloading operation and prevents matting of the curd.

The blade and the mounting arms can be readily reversed with respect to the carriage to enable the blade to move into the closed end of the vat, opposite the open end, so that the entire mass of curd can be removed from the vat by the blade.

The portable unloading unit can be readily moved from vat to vat and serves to unload the curd either into hoops or into a conveying system such as a mechanical or pneumatic conveyor. The unloading unit contains few moving parts, and crevices or cracks are minimized, so that it can be readily flushed out after operation to remove all traces of curd from the conveying system.

Other objects and advantages will appear in the course of the following description.

The drawings illustrate the best mode presently contemplated of carrying out the invention. In the drawings:

FIG. 6 is a vertical section of the portable unloading unit;

FIG. 7 is a section taken along line 7—7 of FIG. 6;

FIG. 8 is a fragmentary vertical section showing the arms and blade in the reversed position for removing the curd from the closed end of the vat;

FIG. 9 is a vertical section of a modified form of the portable unloading unit; and FIG. 10 is a front view of the unloading unit with parts broken away.

Figure 1:
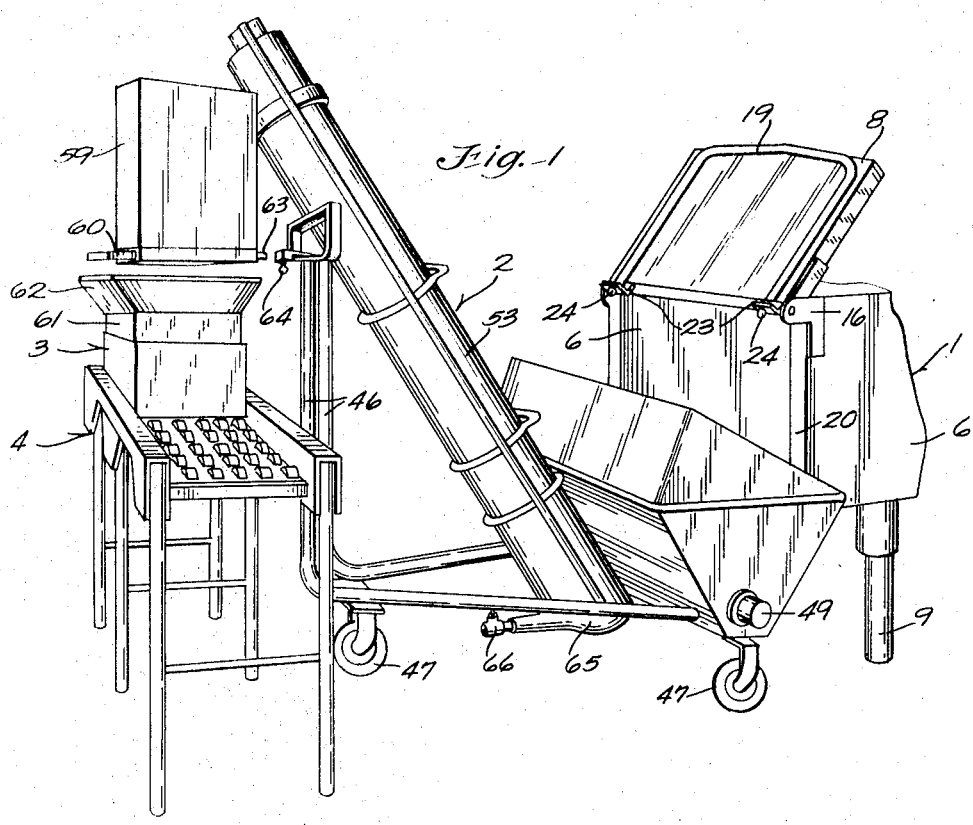
FIG. 1 is a perspective view showing the portable unloading unit being used in conjunction with an open end vat.

The drawings illustrate a finishing vat 1 to be used in a process for producing cheese, such as cheddar, colby, stirred curd, or granulated, and which can also be used to produce certain types of Itallian or Swiss cheese. The vat 1 is provided with an open end and the cheese curd is discharged through the open end to a portable unloading unit 2 which acts to elevate the curd and discharge the curd into a series of hoops 3 which are moved along a conveyor 4.

The finishing vat 1 includes a bottom wall 5, a pair of side walls 6 and an end wall 7. The end of the vat 1 opposite the end wall 7 is open and is enclosed by a hinged door 8. The vat 1 is supported above the floor by a series of legs 9.

Figure 2:
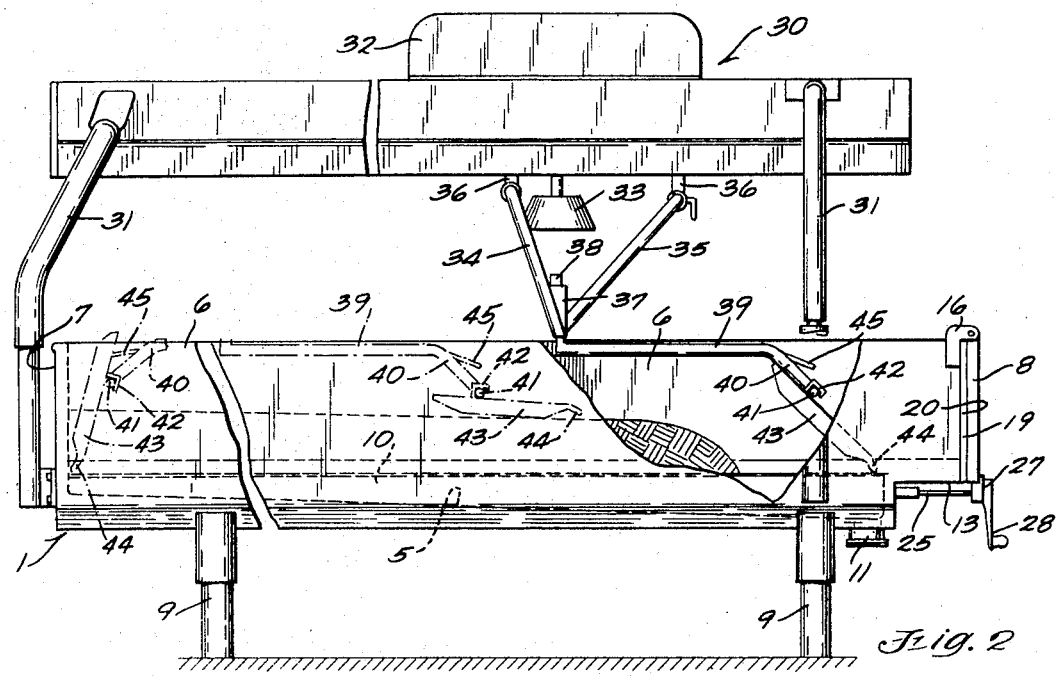
FIG. 2 is a side elevation of the vat with parts broken away in section.
Figure 3:
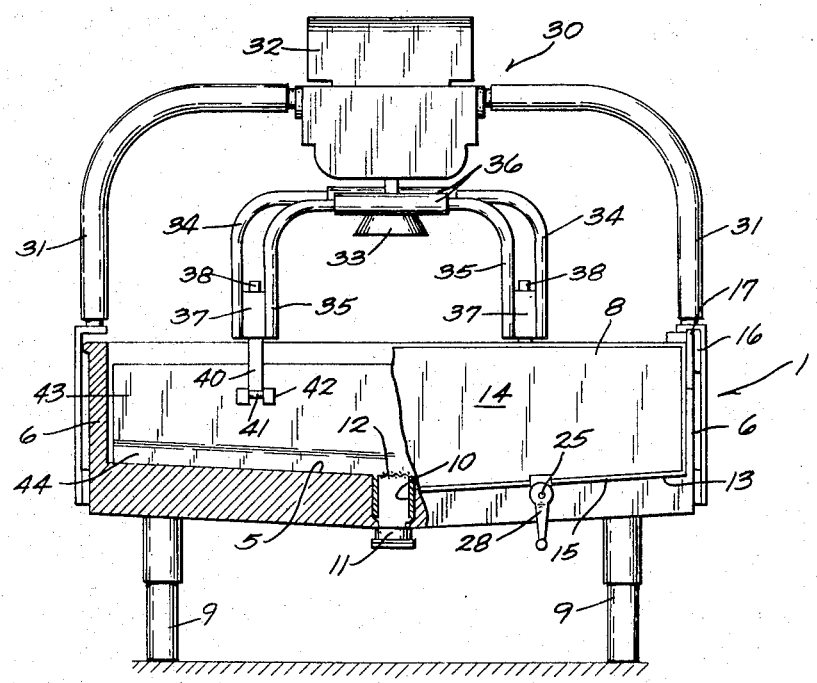
FIG. 3 is an end view of the vat with parts broken away in section.

As best shown in FIGS. 2 and 3, the bottom 5 of the vat 1 slopes downwardly toward the longitudinal center line of the vat, and in addition, the bottom surface 5 slopes from the end wall 7 toward the open end. A trench 10 is formed in a bottom 5 along the longitudinal center line, and drain opening 11 communicates with the trench 10 at its lower end, adjacent the open end of the vat. Trench 10 is enclosed by a generally U-shaped member 12 having solid side walls and a screened or perforated top which extends across the trench 10 and prevents the curd from entering the trench.

The bottom 5 defines a heating chamber, not shown, and a heating medium, such as hot water or steam, is introduced into the heating chamber and serves to maintain the curd and whey within the vat at the desired temperature.

As best shown in FIG. 2, the end of the bottom wall 5 of the vat 1 is recessed, as indicated by 13, and the unloading unit 2 is adapted to be positioned within the recess 13 so that the curd within the vat can be discharged through the open end of the vat directly into the unloading unit, as will be described more fully.

The door 8 which encloses the open end of the vat includes a generally flat, plate member 14 having a peripheral flange 15 which extends outwardly from the edges of the plate 14. To pivotally connect the door 8 to the vat 1, a pair of L-shaped brackets 16 are secured to the outer surface of the side walls 6 of vat 1 and are pivotally connected to hinge arms 17, which extend upwardly from the door plate 14, by bolts 18.

Figure 5:
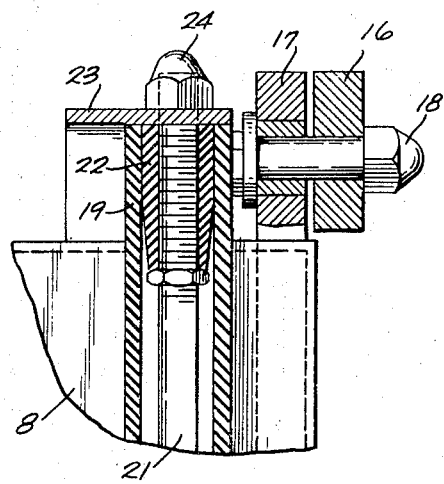
FIG. 5 is a section taken along line 5—5 of FIG. 4.

To provide a fluid-tight seal between the door 8 and the end of the vat 1, a generally U-shaped sealing tube 19 is mounted on the inner surface of door plate 14 and extends around the entire end 20 of the vat. As best shown in FIG. 5, the sealing tube 19 is spaced around a U-shaped metal rod 21. A sealing plug 22 is located between each end of the tube 19 and the respective end of the rod 21 and serves to seal off the space between the rod and the tube.

The sealing assembly is mounted on the door by means of generally L-shaped brackets 23 which are secured to the upper flange 15 of door plate 14, and the ends of the rods 21 extend through the upper flanges of the respective brackets 23 and receive threaded nuts 24. With this construction, the upper ends of the U-shaped sealing tube 19 and rod 21 are firmly secured to the upper end of door 8, but the bottom portion of the tube 19 and rod 21 are not secured to the door and can be manually separated from the door to facilitate cleaning between the sealing tube and the door plate 14.

The flexible sealing tube 19 provides a fluid-tight seal between the door and the end 20 of the vat, and the rod 21, being a rigid member, properly aligns the sealing tube with respect to the door. As previously noted, by connecting the sealing assembly only to the upper portion of the door, the lower end of the sealing tube can be moved away from the door to facilitate cleaning.

Figure 4:
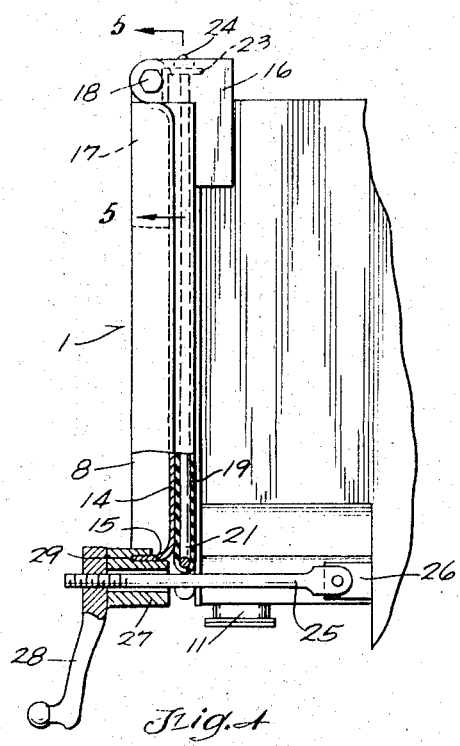
FIG. 4 is a fragmentary enlarged side elevation with parts broken away showing the hinged door which encloses the open end of the vat.

To lock the door 8 to the end 20 of the vat, a pair of locking bolts 25 are pivotally connected to lugs 26 attached to the vat 1. Bolts 25 extend through clamping sleeves 27, and the ends of the bolts 25 receive threaded crank arms 28. As best shown in FIG. 4, the sleeves 27 are provided with slots 29 which receive the lower flange 15 of the door plate 14. By positioning the flange 15 within the slots 29 and rotating the handles 28, the door 8 is firmly secured against the end 20 of the vat to provide a fluid-tight seal between the two members.

As the locking bolts 25 are pivotally connected to the lugs 26, the bolts 25 will drop by gravity to a generally vertical position when the clamping sleeves 27 are released from engagement with flange 15, so that the bolts 25 will not interfere with positioning of the unloading unit 2 in the recess 13 in the bottom of the vat 1.

The curd is unloaded through the open end of the vat when the door 8 is pivoted upwardly to the open position by a structure which includes a frame 30 mounted on the vat 1. Frame 30 includes a series of legs 31 which are attached to the side walls 6 of the vat, and a carriage 32 is mounted for reciprocating movement on the frame 30 above the longitudinal center line of the vat. A rotatable hub 33 extends downwardly from the carriage and during the cheesemaking process, conventional forking paddles or agitators, not shown, can be connected to the rotatable hub 33 to agitate and stir the curd within the vat 1.

The mechanism for unloading the curd through the open end of the vat is carried by the carriage 32 and includes a pair of legs 34 and a pair of legs 35, and the upper ends of the legs 34 and 35 are connected to mounting assemblies 36 carried by the carriage 32. The lower ends of each corresponding pair of legs 34 and 35 are connected to a sleeve 37, and a vertical shaft 38 is adjustably mounted within each sleeve 37. Shaft 38 can be locked with respect to the sleeve 37 by a suitable set screw.

Connected to the lower end of each vertical shaft 38 is a generally horizontal arm 39 and the outer end of each arm 39 terminates in a diagonal section 40. As best shown in FIGS. 2 and 3, the outer extremity of each diagonal section 40 carries a horizontal pin 41, and hooks 42 mounted on a blade 43 are engaged with the ends of each pin 41 on opposite sides of the arm section 40. This connection permits the blade 42 to pivot around the axis of the pins 41. The lower edge of the blade 43 is provided with a plastic wear strip 44 which engages the bottom surface 5 of the vat 1 as the blade is moved within the vat by the carriage and thereby prevents undue wear on the vat surface.

The carriage 32 is adapted to be moved in a reciprocating path along the vat by a conventional control system, not shown. The reciprocating movement is controlled so that the blade 43 will move back in progressively longer strokes of travel from the open end of the vat toward the closed end 7. As the blade 43 moves in its return stroke toward the end 7, the lower end of the blade 43 will engage the pile of curd within the vat thereby pivoting the blade to a generally horizontal position, as shown by the phantom lines in FIG. 2, and permitting the blade to move back over the top of the pile of curd. On the forward stroke, in which the blade is moved toward the open end of the vat, he lower edge of the blade will be pivoted to the rear and the upper edge of the blade will engage the diagonal portions 40 of the arms 39 to thereby maintain the blade in an inclined position as the blade is moved forwardly toward the open end. As the blade 43 moves forwardly, the curd ahead of the blade is pushed out through the open end of the vat into the unloading unit 2.

As the arms 39 extend forwardly a considerable distance from the hub 33, it is possible to install forking paddles with hub 33 at the same time that blade 43 is being used. This permits the curd to be agitated during unloading and prevents matting of the curd.

A provision is made to remove the curd from adjacent the closed end 7 of the vat by reversing the position of the arms 39 and the blade 43. In the reversed position, the arms 39 extend toward the closed end 7 of the vat and the blade 43 is positioned on the outer ends of the arms, as shown in FIG. 8. As the blade is moved toward the open end of the vat, in the direction of the arrow in FIG. 8, the upper end of the blade will engage the ends of the horns 45 which extend outwardly from the diagonal sections 40 of the arms to thereby maintain the blade at the proper angle or attitude. With the blade held in this position, the blade can move across the bottom 5 to remove the curd from adjacent the closed end of the vat 1.

The unloading unit 2 includes a frame 46 which is mounted on a series of wheels 47. A hopper 48 is carried on the frame and has a width greater than the width of the vat 1 so that the hopper can be moved within the recess 13 and the curd can be pushed through the open end of the vat into the hopper.

Mounted transversely within the hopper 48 is a shaft 49 and a pair of auger flights 50 and 51 are secured to the shaft 49. The flights 50 and 51 have reverse pitches so that both flights will act to move the curd toward the center of the hopper 48 as the auger shaft 49 is rotated.

As best shown in FIG. 7, one end of the shaft 49 extends through the end wall of the hopper 48 and is connected to a motor and speed reducing unit 52 which serves to drive the shaft 49.

An auger housing 53 is connected to the hopper 48 and extends upwardly at an inclined angle from the hopper. An opening 54 provides communication between the center of the hopper 48 and the lower end of the auger housing 53. As the auger flights 50 and 51 rotate, the curd is moved toward the center of the hopper 48 and is delivered through the opening 54 into the housing 53 where it is elevated within the housing by an auger 55. The shaft 56 of auger 55 is driven by a motor and speed reducing unit 57 mounted on the upper end of the housing 53.

While the drawings illustrate the opening 54 being located centrally of hopper 48 and opposite pitched flights 50 and 51 acting to convey the curd toward the central opening, it is contemplated that the opening can be positioned at the end of the hopper 48, in which case the auger flight can have the same pitch throughout its length.

The curd being moved upwardly within the housing 53 is discharged through a chute 58 into a hopper 59 which is connected to chute 58. The lower open end of the hopper 59 is enclosed by a sliding door 60.

The curd is discharged through the opening in the lower end of hopper 59 into the hoops 3 as the hoops are moved along the conveyor 4, and a hoop sleeve 61 and a hoop funnel 62 are located within the upper end of the hoop to aid in filling the hoop.

A provision is made to stop the operation of the hopper motor 52, as well as the auger motor 57 when the door 60 is moved to the closed position. In this regard, the end of the door is provided with a projection 63 which engages a switch 64 when the slide door is moved to the closed position. Switch 64 is operably connected to the motors 52 and 57 and actuation of switch 64 by door projection 63 function to open the electric circuit to motors 52 and 57 and thereby stop operation of augers 50, 51 and 55, thus insuring that no curd will be moved through the system when the slide door 60 is closed.

The discharge of the curd into the hoops 3 is only an illustration as to the manner in which the curd can be conveyed. It is contemplated that instead of discharging the curds into the hoops 3, the curd may be discharged into large containers or drums, or the curd can be discharged from the elevator 53 onto a conveyor system such as a mechanical or pneumatic conveyor for transportation to a hooping area.

In some instances, the hopper 59 and slide door 60 can be eliminated, and the curd will then be discharged directly from chute 58 into large containers or onto a conveyor system. In this situation, operation of the motors 52 and 57 would be controlled manually.

The unloading unit 2 of the invention can be readily cleaned after use by flushing with water from the upper end of the hopper 48, as well as from the upper end of the housing 53. As best shown in FIG. 6, the lower end of the housing 53 is provided with a drain outlet 65 which is normally enclosed by a drain gate 66. During the cleaning or flushing operation, the drain gate 66 is opened and the water used for flushing will readily drain from both the hopper 48 and the housing 53 through the outlet 65.

FIGS. 9 and 10 illustrate a modified form of the unloading unit which includes a frame 67 mounted on a series of wheels 68. A hopper 69, similar to hopper 48 of the first embodiment, is carried on the frame 67 and has a width greater than the width of the vat 1, so that the curd can be pushed through the open end of the vat and into the hopper.

Mounted transversely within the hopper is a shaft 70 and a pair of spirally arranged wires 71 and 72 are connected to the shaft 70 by a series of supports 73. The spiral wires 71 and 72 have reverse pitches so that both spirals will act to move the curd toward the center of the hopper 69 as the auger shaft 70 is rotated. The use of the spiral wires, rather than the solid spiral flight, as shown in the first embodiment, provides a more gentle conveying action for the curd to the elevator.

The ends of the shaft 70 are journaled within the side walls of the hopper and one end of the shaft projects beyond the respective side wall and is connected through a speed-reducing unit 74 to a motor 75. Operation of the motor 75 acting through the speed reducing transmission 74 serves to rotate the shaft 70 and spiral wires 71 and 72 to thereby gently move the curd toward the center of the hopper.

As illustrated in FIG. 9, the forward wall of the hopper is adapted to engage the end of the vat so that the curd from the vat can be pushed into the hopper. Located beneath the upper edge of the forward wall of the hopper is a trough 76 which serves to collect any whey or small particles of curd which may fall through the joint between the hopper 69 and the end wall of the vat 1.

The rear wall of the hopper is provided with an upstanding deflector 77 which acts to deflect the curd being pushed from the vat into the hopper 69.

As the curd being discharged from the vat into the hopper will provide a substantial force against the hopper 69, a provision is made to lock the hopper against the end wall of the vat. In this regard a pair of arms 78 are removably connected to the supports 79 which carry the legs 31. As shown in FIG. 9, the end of each arm 78 is provided with a hook 80 which is engaged with the lower end of the support 79, while the opposite end of each arm is provided with a hook 81 which is engaged with the upper edge of the deflector 77. The side edges of the deflector 77, to which the arms 78 are attached, have a lesser height than the central portion so that the arms are in a generally horizontal position. With the arms 78 in engagement with the deflector 77, the hopper 69 will be held firmly against the end wall of the vat. The unit for elevating the curd is similar to that described with respect to the first embodiment and includes an auger housing 82 connected to the hopper 69 and extending upwardly at an inclined angle from the hopper. An opening 83 provides communication between the central portion of the hopper and the lower end of the auger housing 81. As the wire spirals 71 and 72 rotate, the curd is moved toward the center of the hopper and is delivered through the opening 83 into the lower end of the housing 82 where it is elevated within the housing by an auger 84. The shaft 85 of auger 84 is driven by a motor 86 acting through a speed reducing unit 87.

The curd being moved upwardly within the housing 82 is discharged through a chute 88 into a hopper 89 which is connected to the chute. The lower end of the hopper is enclosed by a sliding door 90, similar to sliding door 60 of the first embodiment. The curd is discharged through the opening in the lower end of the hopper 89 into the hoops 3 as the hoops are moved along the conveyor 4, and as previously described, a hoop sleeve 61 and a hoop funnel 62 are located within the upper end of the hoop to aid in filling the hoop.

In the embodiment shown in FIGS. 9 and 10, a provision is also incorporated to stop the operation of the hopper motor 75 as well as the elevator motor 86 when the door 90 is moved to the closed position. This is accomplished by providing the door with a projection 91 which engages a switch 92, similar to switch 64 of the first embodiment, when the slide door is moved to the closed position.

As in the case of the first embodiment, the lower end of the auger housing 82 is provided with a drain outlet 93 which is normally enclosed by a drain plug or gate 94. During the cleaning or flushing operation, the drain gate 94 is opened and the water used for flushing will readily drain from both the hopper 69 and the housing 82 through the outlet 93.

The invention acts to automatically unload curd from the vat and convey the curd directly into hoops or to any other loading station. By eliminating the manual labor that is normally required for unloading curd from the vat and loading it into hoops a substantial cost reduction is realized, less waste or spillage results and a more sanitary operation is produced.

The blade employed to discharge the curd from the vat is novel in that it is located a considerable distance ahead of the hub so that forking paddles can be used in conjunction with the blade to keep the curd from matting during the unloading operation. In addition, the blade and blade supporting arms can be reversed in position to enable the blade to remove the curd from the closed end of the vat.

The closure door for the unloading vat is provided with a unique sealing arrangement which provides a fluid-tight seal when the door is closed and yet enables the seal to be readily pulled away from the door to permit cleaning between the seal and the door.

I claim:

1. In a cheese making apparatus, a vat structure to contain cheese curd and having an open end and having an end surface bordering the open end, a door structure to enclose the open end of the vat and having a surface facing said end surface, said surface having a joint therebetween, hinge means for hinging the door structure to the vat structure, a seal assembly to seal the joint between said surfaces and including a generally U-shaped flexible tubular sealing member having a pair of end sections and a central section connecting the end sections, said seal assembly also including a rigid generally U-shaped reinforcing member disposed within said tubular sealing member with the ends of said reinforcing member projecting outwardly of the corresponding end sections of said sealing member, connecting means to connect said projecting ends of the reinforcing member to one of said structures adjacent said hinge means, said central section of the sealing member being free of attachment to the surface of said one structure so that said central section is freely movable away from the surface of said one structure to clean therebetween, and clamping means for clamping the door structure to the vat structure.

2. The apparatus of claim 1, wherein the projecting ends of the reinforcing member are connected to the door structure, and said hinge means is located at the upper end of said door structure and said clamping means is located at the lower end of the door structure.

3. The apparatus of claim 1, wherein the projecting ends of the reinforcing member are threaded, and said connecting means comprises brackets on the door structure having openings to receive said threaded ends, and a fastener engaged with each threaded end of the reinforcing member to hold the reinforcing member to said brackets.

4. The apparatus of claim 1, and including a sealing plug disposed between each end of the reinforcing member and the corresponding end section of the sealing member to seal the space therebetween.

* * * * *

UNITED STATES PATENT OFFICE
CERTIFICATE OF CORRECTION

Patent No. 3,853,241   Dated December 10, 1974

Inventor(s)   NORMAN J. PETERS

It is certified that error appears in the above-identified patent and that said Letters Patent are hereby corrected as shown below:

Front Page, Inventor's Residence, Cancel "Fon du Lac" and substitute therefor ---Fond du Lac---, Column 4, line 20, Cancel "42" and substitute therefor ---43---, Column 4, line 38, Cancel "he" and substitute therefor ---the---, Column 8, line 9  Cancel "surface" (third occurrence) and substitute therefor ---surfaces---.

Signed and sealed this 22nd day of April 1975.

(SEAL)
Attest:

RUTH C. MASON
Attesting Officer

C. MARSHALL DANN
Commissioner of Patents
and Trademarks